United States Patent
Lee et al.

(10) Patent No.: US 12,167,396 B2
(45) Date of Patent: Dec. 10, 2024

(54) CLEARING PART OF SIDELINK GRANT FOR SINGLE PDU TRANSMISSION AND SIDELINK RESOURCE ALLOCATION

(71) Applicant: LG Electronics Inc., Seoul (KR)

(72) Inventors: Youngdae Lee, Seoul (KR); Seungmin Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 17/770,398

(22) PCT Filed: Oct. 28, 2020

(86) PCT No.: PCT/KR2020/014764
§ 371 (c)(1),
(2) Date: Apr. 20, 2022

(87) PCT Pub. No.: WO2021/085992
PCT Pub. Date: May 6, 2021

(65) Prior Publication Data
US 2022/0394744 A1    Dec. 8, 2022

Related U.S. Application Data

(60) Provisional application No. 62/927,083, filed on Oct. 28, 2019.

(51) Int. Cl.
*H04W 72/12* (2023.01)
*H04B 17/318* (2015.01)
(Continued)

(52) U.S. Cl.
CPC .......... *H04W 72/20* (2023.01); *H04B 17/318* (2015.01); *H04W 72/23* (2023.01); *H04W 72/569* (2023.01)

(58) Field of Classification Search
CPC ..... H04W 72/20; H04W 72/21; H04W 72/12; H04W 72/40; H04W 72/25; H04W 72/27;
(Continued)

(56) References Cited

U.S. PATENT DOCUMENTS 11,943,067 B2 *   3/2024  Cao ................... H04L 5/0005
2017/0295559 A1  10/2017  Agiwal et al.
(Continued)

FOREIGN PATENT DOCUMENTS

CN    107466068 A    12/2017
CN    107592984 A    1/2018
(Continued)

OTHER PUBLICATIONS

Intel Corporation, Resource Allocation Mode-2 for NR V2X Sidelink Communication, R1-1910650, 3GPP TSG RAN WG1 Meeting #98bis, Chongqing, China, Oct. 8, 2019, sections 2.2.1-2.4.2.
(Continued)

*Primary Examiner* — Phong La
(74) *Attorney, Agent, or Firm* — BRYAN CAVE LEIGHTON PAISNER LLP

(57) ABSTRACT

A method and apparatus for clearing a part of a sidelink grant in a wireless communication system is provided. A first wireless device reserves a set of resources comprising at least a first resource and a second resource for sidelink transmission to a second wireless device, and receives, from a third wireless device, sidelink control information (SCI) which schedules sidelink transmission from the third wireless device. When (i) priority of the sidelink transmission from the third wireless device is higher than priority of the sidelink transmission to the second wireless device, (ii) reference signal received power (RSRP) measurement for the received SCI is higher than a threshold, and (iii) a resource for the sidelink transmission from the third wireless
(Continued)

device overlaps with the first resource, the first wireless device clears the first resource from the set of resources, and adds a third resource to the set of resources.

12 Claims, 13 Drawing Sheets

(51) Int. Cl.
*H04W 72/14* (2009.01)
*H04W 72/20* (2023.01)
*H04W 72/23* (2023.01)
*H04W 72/566* (2023.01)

(58) Field of Classification Search
CPC ............... H04W 72/29; H04W 72/569; H04W 72/566; H04W 72/56; H04W 72/563; H04W 72/23; H04W 72/231
See application file for complete search history.

(56) References Cited

U.S. PATENT DOCUMENTS

| | | | | |
|---|---|---|---|---|
| 2020/0305127 | A1* | 9/2020 | Huang | H04W 72/0453 |
| 2021/0075552 | A1* | 3/2021 | Huang | H04L 1/1864 |
| 2021/0105104 | A1* | 4/2021 | Cao | H04L 1/1896 |
| 2022/0150730 | A1* | 5/2022 | Freda | H04W 24/04 |

FOREIGN PATENT DOCUMENTS

| | | | | |
|---|---|---|---|---|
| CN | 108028730 | A | | 5/2018 |
| CN | 108029131 | A | | 5/2018 |
| CN | 108633074 | A | | 10/2018 |
| CN | 109565791 | A | | 4/2019 |
| CN | 109644433 | A | | 4/2019 |
| CN | 110351858 | A | | 10/2019 |
| EP | 3432657 | A1 | | 1/2019 |
| IN | 201827049261 | A | | 7/2019 |
| KR | 20210001752 | A | * | 1/2021 |
| WO | 2018/031172 | A1 | | 2/2018 |
| WO | 2018031086 | | | 2/2018 |
| WO | 2019/096705 | A1 | | 5/2019 |
| WO | 2019170084 | A1 | | 9/2019 |
| WO | 2020017939 | | | 1/2020 |
| WO | WO-2020033088 | A1 | * | 2/2020 ........... H04B 17/318 |

OTHER PUBLICATIONS

LG Electronics, Discussion on resource allocation for mode 2, R1-1910779, 3GPP TSG RAN WG1 #98bis, Chongqing, China, Oct. 8, 2019, sections 1-2.4.
Fraunhofer HHI et al., Resource allocation for mode 2 NR V2X, R1-1910556, 3GPP TSG RAN WG1 #98bis, Chongqing, China, Oct. 7, 2019, sections 1-6.2.
Qualcomm Incorporated, Sidelink resource allocation mechnism for NR V2X, R1-1911106, 3GPP TSG RAN WG1 #98bis, Chongqing, China, Oct. 8, 2019, sections 1-6.
3GPP TS 38.885 V16.0.0, section 5.3.
3GPP TS 36.321 V15.7.0, sections 5.14.1.1 and 5.14.1.5.
5G V2X, Aug. 15, 2019.
LTE-Ev2x, Oct. 15, 2018.
MediaTek Inc., "On sidelink resource allocation mechanism", 3GPP TSG RAN WG1 Meeting #96bis, R1-1904494, Xian, China, Apr. 8-12, 2019.
Intel Corporation, "Sidelink Resource Allocation Design for NR V2X Communication", 3GPP TSG RAN WG1 Meeting #96bis, R1-1904296, Xi'an, China, Apr. 8-12, 2019.
MediaTek Inc., "On sidelink mode-2 resource allocation", 3GPP TSG RAN WG1 Meeting #97, R1-1906555, Reno, USA, May 13-17, 2019.

* cited by examiner

CLEARING PART OF SIDELINK GRANT FOR SINGLE PDU TRANSMISSION AND SIDELINK RESOURCE ALLOCATION

This application is the National Stage filing under 35 U.S.C. 371 of International Application No. PCT/KR2020/014764 filed on Oct. 28, 2020, which claims priority to U.S. Provisional Application No. 62/927,083 filed on Oct. 28, 2019, the contents of which are all hereby incorporated by reference herein in their entirety.

TECHNICAL FIELD

The present disclosure relates to clearing a part of a sidelink grant for a single protocol data unit (PDU) transmission and sidelink resource allocation.

BACKGROUND 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible. Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for triggering a transmission carrier or resource reselection when sidelink transmission overlaps with another sidelink transmission scheduled by other device and both transmissions cannot be performed simultaneously.

Another aspect of the present disclosure is to provide a method and apparatus for clearing a part of a sidelink grant when a transmission carrier or resource reselection is triggered.

In an aspect, a method performed by a first wireless device configured to operate in a wireless communication system is provided. The method includes reserving a set of resources comprising at least a first resource and a second resource for sidelink transmission to a second wireless device, and receiving, from a third wireless device, sidelink control information (SCI) which schedules sidelink transmission from the third wireless device. The method further includes, when (i) a priority of the sidelink transmission from the third wireless device is higher than a logical channel priority of the sidelink transmission to the second wireless device, (ii) a result of reference signal received power (RSRP) measurement for the received SCI is higher than a threshold, and (iii) the SCI determines a resource for the sidelink transmission from the third wireless device which overlaps with the first resource, clearing the first resource from the set of resources, and adding a third resource to the set of resources.

In another aspect, an apparatus for implementing the above method is provided.

The present disclosure can have various advantageous effects.

For example, data loss which can be caused by collision of multiple SL transmissions by different UEs can be avoided.

For example, a UE performing HARQ transmission of a packet by using radio resources can dynamically and efficiently allocate resources for retransmissions of the packet.

For example, a UE can dynamically and efficiently allocate resources for retransmissions of the packet by considering service characteristics and/or requirements.

For example, a UE can dynamically and efficiently allocate resources for retransmissions of the packet in particular when packets from various services are multiplexed into a single data unit.

For example, the system can provide dynamic and efficient allocation of resources for data retransmissions for a UE performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
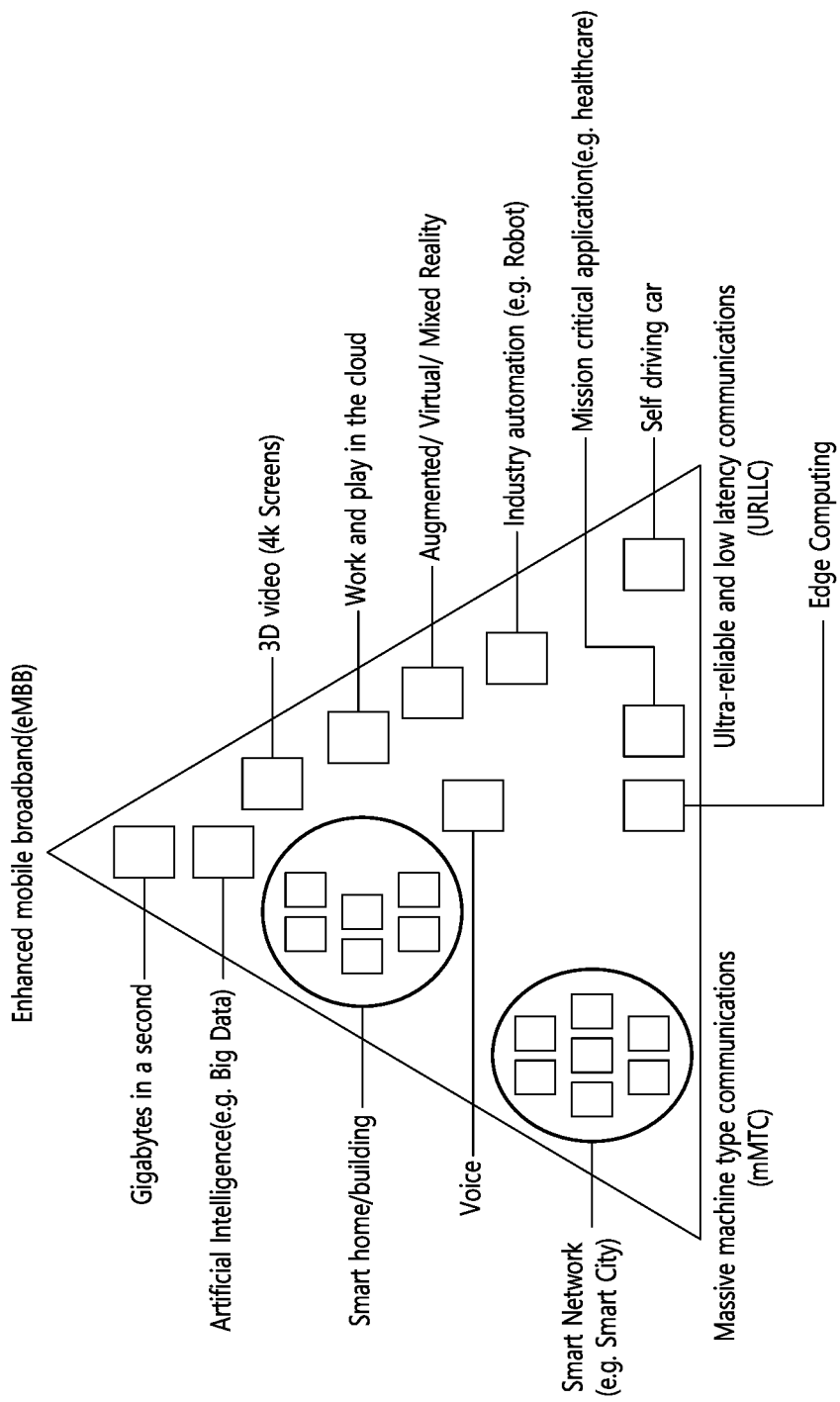
FIG. 1 shows examples of 5G usage scenarios to which the technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink (DL) and SC-FDMA in uplink (UL). LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
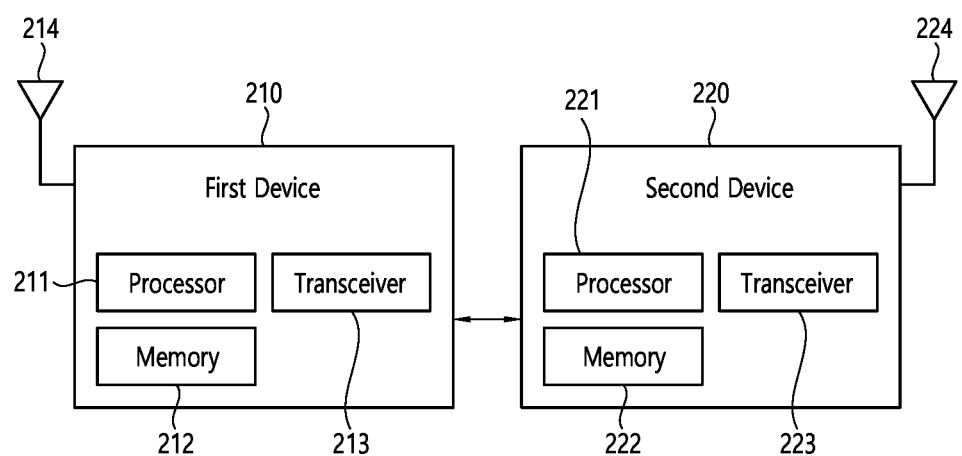
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety.

For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna.

For example, antenna 214 and/or antenna 224 may be configured to transmit and receive wireless signals.

Figure 3:
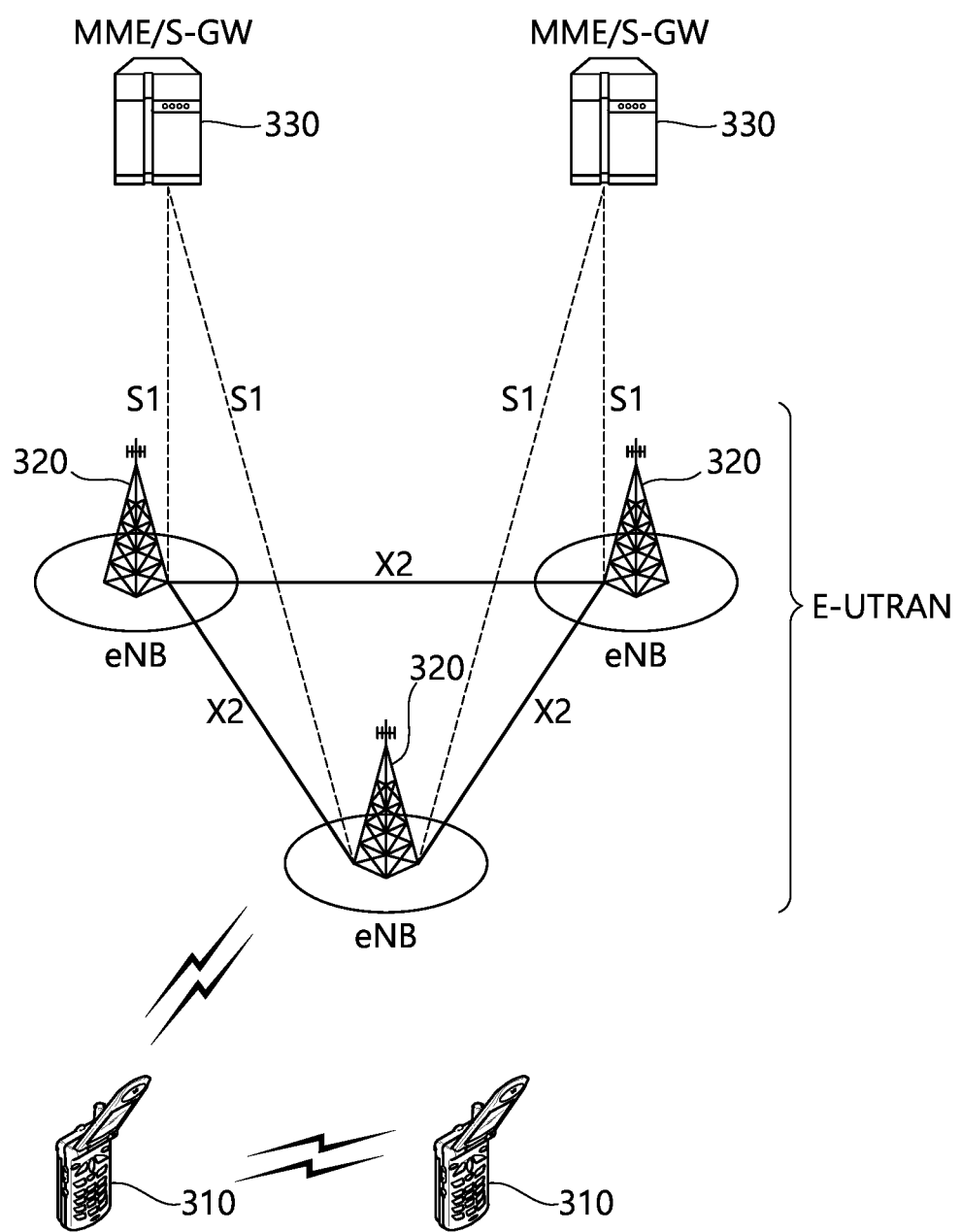
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
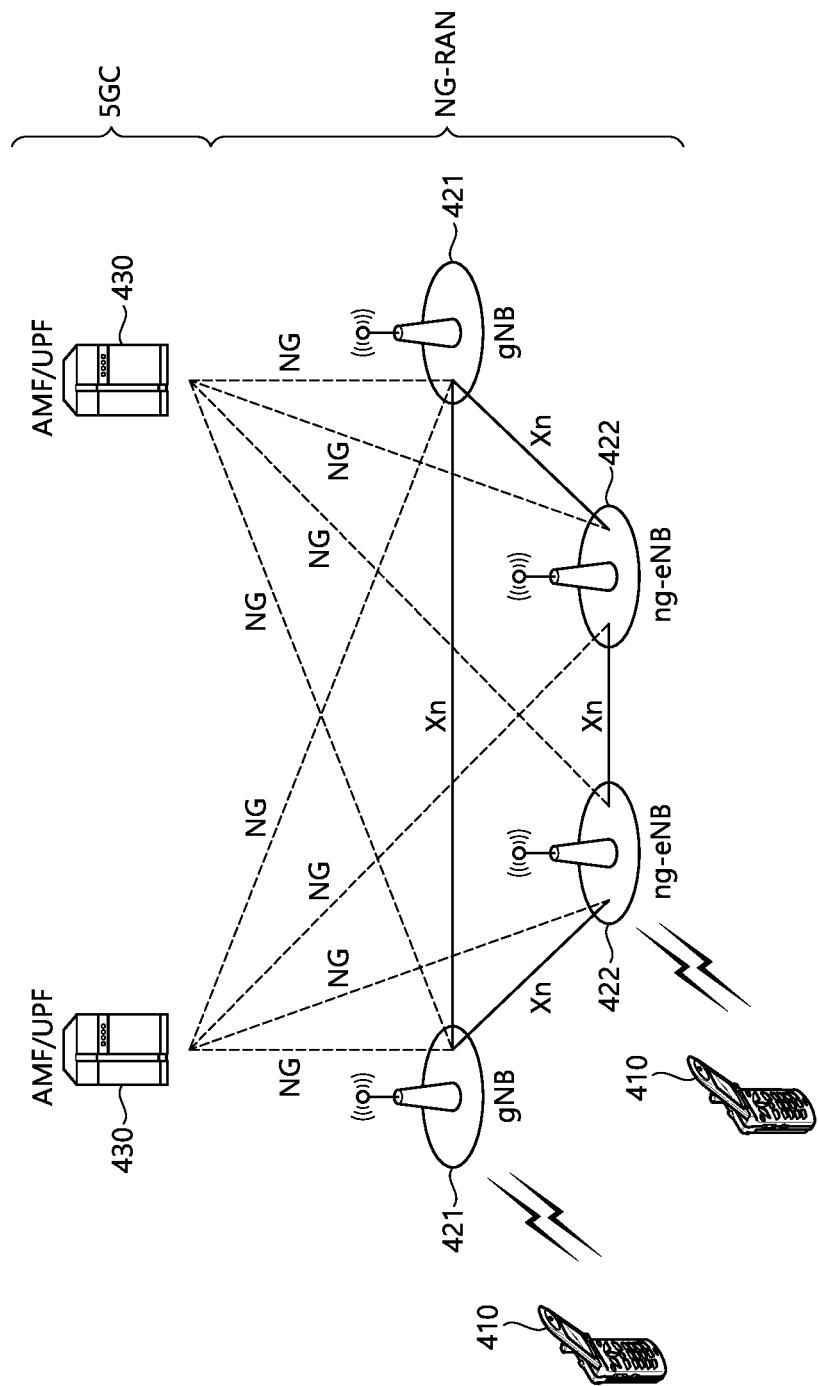
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 5:
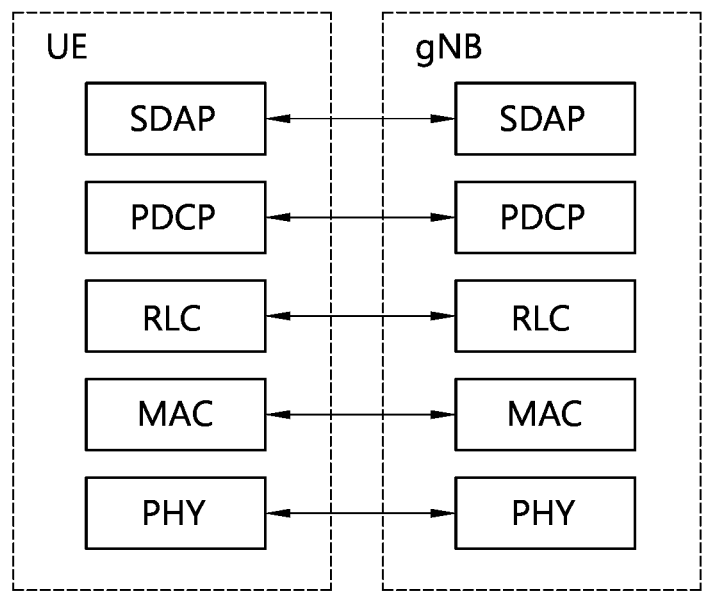
FIG. 5 shows a block diagram of a user plane protocol stack to which the technical features of the present disclosure can be applied.
Figure 6:
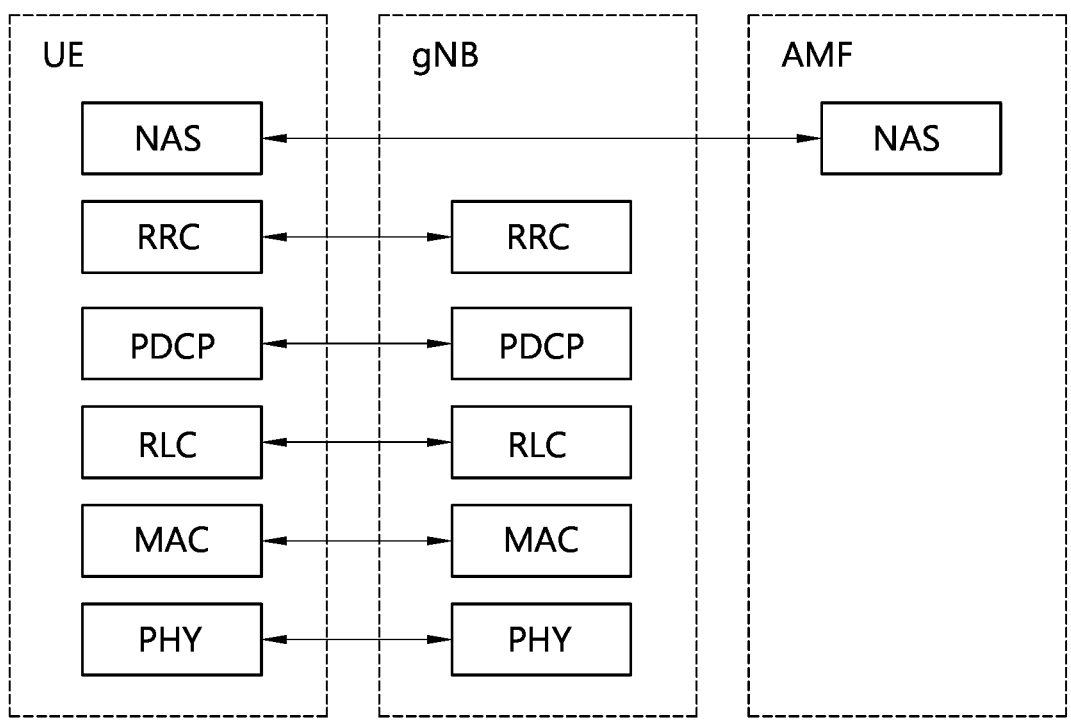
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
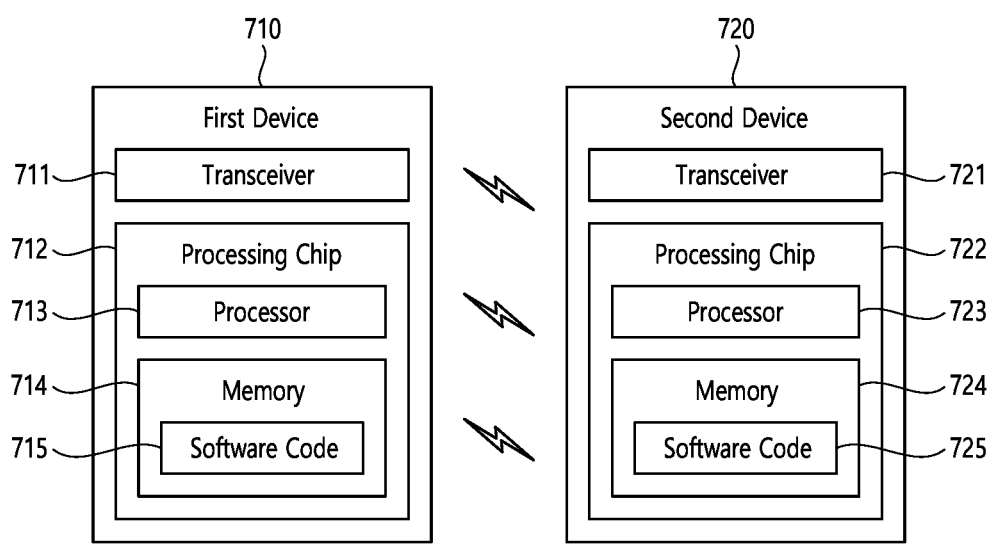
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
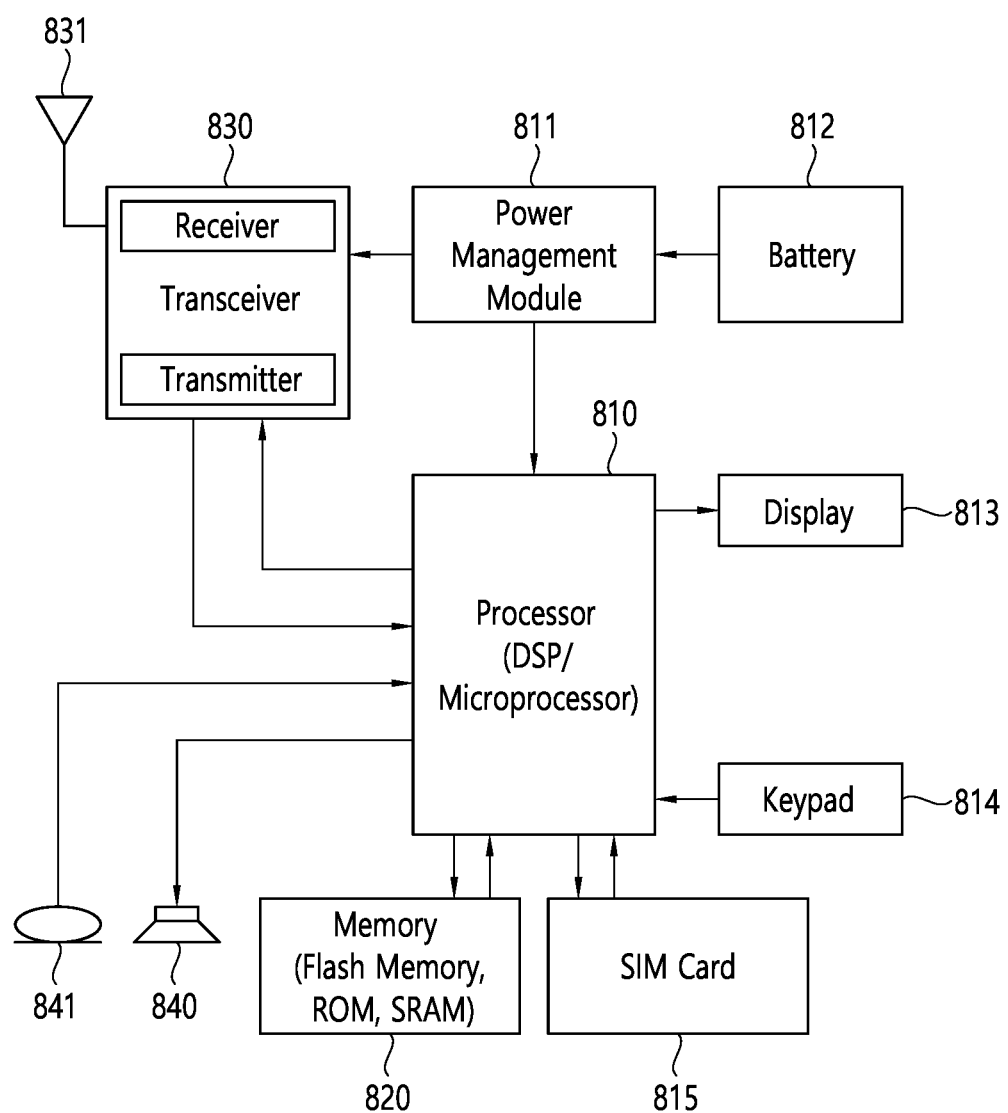
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

Sidelink (SL) grant reception and sidelink control information (SCI) transmission is described. Section 5.14.1.1 of 3GPP TS 36.321 V15.7.0 can be referred.

In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current sidelink control (SC) period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;

2> clear the configured sidelink grant at the end of the corresponding SC period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC period which starts at least 4 subframes after the subframe in which the sidelink grant was selected;

2> clear the configured sidelink grant at the end of the corresponding SC period; Retransmissions on SL-SCH cannot occur after the configured sidelink grant has been cleared.

Sidelink grants are selected as follows for vehicle-to-everything (V2X) sidelink communication:

1> if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

2> use the received sidelink grant to determine the number of HARQ retransmissions and the set of subframes in which transmission of SCI and SL-SCH occur;

2> consider the received sidelink grant to be a configured sidelink grant for the carrier;

1> if the MAC entity is configured by upper layers to receive a sidelink grant on the PDCCH addressed to SL semi-persistent scheduling (SPS) V2X radio network temporary identity (V-RNTI), the MAC entity shall for each SL SPS configuration and for each carrier configured in sl-V2X-ConfigDedicated for which a sidelink grant has been received on the PDCCH addressed to SL semi-persistent scheduling V-RNTI for this TTI:

2> if PDCCH contents indicate SPS activation:

3> use the received sidelink grant to determine the number of HARQ retransmissions and the set of subframes in which transmission of SCI and SL-SCH occur;

3> consider the received sidelink grant to be a configured sidelink grant for the carrier.

2> if PDCCH contents indicate SPS release:

3> clear the corresponding configured sidelink grant for the carrier.

1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each sidelink process configured for multiple transmissions:

2> if there is no configured sidelink grant associated with the sidelink process on any carrier allowed for the STCH as indicated by upper layers:

3> trigger the TX carrier (re-)selection procedure as specified below;

2> else if there is a configured sidelink grant associated with the sidelink process:

3> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed modulation and coding scheme (MCS) configured by upper layers in maxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated ProSe-per-packet priority (PPPP), and the MAC entity selects not to perform transmission(s) corresponding to a single MAC PDU; or 3> if the pool of resources where the sidelink grant is configured for the sidelink process, is reconfigured by upper layers:

4> trigger the TX carrier (re-)selection procedure as specified below;

4> clear the configured sidelink grant associated to the sidelink process;

4> flush the HARQ buffer associated to the sidelink process;

3> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

4> clear the configured sidelink grant, if available;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> use the previously selected sidelink grant for the number of transmissions of the MAC PDUs with the resource reservation interval to determine the set of subframes in which transmissions of SCI and SL-SCH occur;

4> consider the selected sidelink grant to be a configured sidelink grant;

2> if the TX carrier (re-)selection procedure was triggered in above and one or more carriers have been (re-)selected in the Tx carrier (re-)selection:

3> determine the order of the (re-)selected carriers, according to the decreasing order based on the highest priority of logical channels which are allowed on each (re-) selected carrier, and perform the following for each Sidelink process on each (re-) selected carrier according to the order:

4> select one of the allowed values configured by upper layers in restrictResourceReservationPeriod and set the resource reservation interval by multiplying 100 with the selected value;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the channel busy ratio (CBR) measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity from the resources indicated by the physical layer, according to the amount of selected frequency resources. The selected time and frequency resources shall fulfil the physical layer requirements, and the random function shall be such that each of the allowed selections can be chosen with equal probability;

4> use the randomly selected resource to select a set of periodic resources spaced by the resource reservation interval for transmission opportunities of SCI and SL-SCH corresponding to the number of transmission opportunities of MAC PDUs;

4> if the number of HARQ retransmissions is equal to 1:

5> if there are available resources left in the resources indicated by the physical layer that meet the conditions for more transmission opportunities:

6> randomly select the time and frequency resources for one transmission opportunity from the available resources, according to the amount of selected frequency resources. The selected time and frequency resources shall fulfil the physical layer requirements, and the random function shall be such that each of the allowed selections can be chosen with equal probability;

6> use the randomly selected resource to select a set of periodic resources spaced by the resource reservation interval for the other transmission opportunities of SCI and SL-SCH corresponding to the number of retransmission opportunities of the MAC PDUs;

6> consider the first set of transmission opportunities as the new transmission opportunities and the other set of transmission opportunities as the retransmission opportunities;

6> consider the set of new transmission opportunities and retransmission opportunities as the selected sidelink grant.

4> else:

5> consider the set as the selected sidelink grant;

4> use the selected sidelink grant to determine the set of subframes in which transmissions of SCI and SL-SCH occur;

4> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a sidelink process:

2> trigger the TX carrier (re-)selection procedure as specified below;

2> if one or more carriers have been (re-)selected in the Tx carrier (re-)selection:

3> determine the order of the (re-)selected carriers, according to the decreasing order based on the highest priority of logical channels which are allowed on each (re-) selected carrier, and perform the following for each Sidelink process on each (re-) selected carrier according to the order:

4> select the number of HARQ retransmissions from the allowed numbers that are configured by upper layers in allowedRetxNumberPSSCH included in pssch-TxConfig-List and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity of SCI and SL-SCH from the resources indicated by the physical layer, according to the amount of selected frequency resources. The selected time and frequency resources shall fulfil the physical layer requirement, and the random function shall be such that each of the allowed selections can be chosen with equal probability;

4> if the number of HARQ retransmissions is equal to 1:

5> if there are available resources left in the resources indicated by the physical layer that meet the conditions for one more transmission opportunity:

6> randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements, and the random function shall be such that each of the allowed selections can be chosen with equal probability;

6> consider a transmission opportunity which comes first in time as the new transmission opportunity and a transmission opportunity which comes later in time as the retransmission opportunity;

6> consider both of the transmission opportunities as the selected sidelink grant;

4> else:

5> consider the transmission opportunity as the selected sidelink grant;

4> use the selected sidelink grant to determine the subframes in which transmission(s) of SCI and SL-SCH occur];

4> consider the selected sidelink grant to be a configured sidelink grant.

For V2X sidelink communication, the UE should ensure the randomly selected time and frequency resources fulfill the latency requirement.

The MAC entity shall for each subframe:

1> for each configured sidelink grant occurring in this subframe:

2> if SL_RESOURCE_RESELECTION_COUNTER=1 for the sidelink process associated with the configured sidelink grant and the MAC entity randomly selected, with equal probability, a value in the interval [0, 1] which is above the probability configured by upper layers in probResourceKeep:

3> set the resource reservation interval for the configured sidelink grant equal to 0;

2> if the configured sidelink grant corresponds to transmission of SCI:

3> for V2X sidelink communication in UE autonomous resource selection:

4> consider the selected transmission format to be SL-V2X-TxProfile for the highest priority of the sidelink logical channel(s) in the MAC PDU;

4> select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers if CBR measurement results are available or the corresponding defaultTxConfigIndex configured by upper layers if CBR measurement results are not available;

3> for V2X sidelink communication in scheduled resource allocation:

4> consider the selected transmission format to be SL-V2X-TxProfile for the highest priority of the sidelink logical channel(s) in the MAC PDU;

4> select a MCS which is associated with the selected transmission format unless it is configured by upper layer;

3> instruct the physical layer to transmit SCI corresponding to the configured sidelink grant;

3> for V2X sidelink communication, deliver the configured sidelink grant, the associated HARQ information and the value of the highest priority of the sidelink logical channel(s) in the MAC PDU to the sidelink HARQ entity for this subframe;

2> else if the configured sidelink grant corresponds to transmission of first transport block for sidelink communication:

3> deliver the configured sidelink grant and the associated HARQ information to the sidelink HARQ entity for this subframe.

TX carrier (re-)selection for V2X sidelink communication is described. Section 5.14.1.5 of 3GPP TS 36.321 V15.7.0 can be referred.

The MAC entity shall consider a CBR of a carrier to be one measured by lower layers if CBR measurement results are available, or the corresponding defaultTxConfigIndex configured by upper layers for the carrier if CBR measurement results are not available.

If the TX carrier (re-)selection is triggered for a sidelink process, the MAC entity shall:

1> if there is no configured sidelink grant on any carrier allowed for the sidelink logical channel where data is available as indicated by upper layers:

2> for each carrier configured by upper layers associated with the concerned sidelink logical channel:

3> if the CBR of the carrier is below threshCBR-FreqReselection associated with the priority of the sidelink logical channel:

4> consider the carrier as a candidate carrier for TX carrier (re-)selection for the concerned sidelink logical channel.
  1> else:
    2> for each sidelink logical channel, if any, where data is available and that are allowed on the carrier for which Tx carrier (re-)selection is triggered:
      3> if the CBR of the carrier is below threshCBR-FreqKeeping associated with priority of the sidelink logical channel:
        4> select the carrier and the associated pool of resources.
      3> else:
        4> for each carrier configured by upper layers on which the sidelink logical channel is allowed, if the CBR of the carrier is below threshCBR-FreqReselection associated with the priority of the sidelink logical channel
          5> consider the carrier as a candidate carrier for TX carrier (re-)selection.

The MAC entity shall:
  1> if one or more carriers are considered as the candidate carriers for TX carrier (re-) selection:
    2> for each sidelink logical channel allowed on the carrier where data is available and Tx carrier (re-)selection is triggered:
      3> select one or more carrier(s) and associated pool(s) of resources among the candidate carriers with increasing order of CBR from the lowest CBR.

Sidelink resource allocation in 5G NR is described. Section 5.3 of 3GPP TS 38.885 V16.0.0 can be referred.

At least the following two SL resource allocation modes may be defined.

Mode 1: BS schedules SL resource(s) to be used by UE for SL transmission(s).

Mode 2: UE determines, i.e. BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s), a functionality which can be part of a), c), d)
c) UE is configured with NR configured grant (Type-1 like) for SL transmission
d) UE schedules SL transmissions of other UEs Resource allocation mode 2 supports reservation of SL resources at least for blind retransmission.

Sensing- and resource (re-)selection-related procedures are supported for resource allocation mode 2.

The sensing procedure considered is defined as decoding sidelink control information (SCI(s)) from other UEs and/or SL measurements. Decoding SCI(s) in this procedure provides at least information on SL resources indicated by the UE transmitting the SCI. The sensing procedure uses a L1 SL reference signal received power (RSRP) measurement based on SL demodulation reference signal (DMRS) when the corresponding SCI is decoded.

The resource (re-)selection procedure considered uses the results of the sensing procedure to determine resource(s) for SL transmission.

For mode 2(a), SL sensing and resource selection procedures may be considered in the context of a semi-persistent scheme where resource(s) are selected for multiple transmissions of different transport blocks (TBs) and a dynamic scheme where resource(s) are selected for each TB transmission.

The following techniques are studied to identify occupied SL resources:
  Decoding of SL control channel transmissions
  SL measurements
  Detection of SL transmissions The following aspects are studied for SL resource selection
  How a UE selects resource for physical sidelink control channel (PSCCH) and physical sidelink shared channel (PSSCH) transmission (and other SL physical channel/signals that are defined)
  Which information is used by UE for resource selection procedure For out-of-coverage operation, mode 2(c) assumes a (pre-)configuration of single or multiple SL transmission patterns, defined on each SL resource pool. For in-coverage operation, mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For mode 2(d), in the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signaling is used to provide the configurations. Such functionality is up to UE capability(ies).

Sidelink resource allocation is described in detail. If the TX UE is in RRC_CONNECTED and configured for gNB scheduled sidelink resource allocation (e.g., mode 1), the TX UE may transmit sidelink UE information including traffic pattern of Service, TX carriers and/or RX carriers mapped to service, QoS information related to service (e.g. 5QI, ProSe-per-packet priority (PPPP), ProSe-per-packet reliability (PPPR), QoS class identifier (QCI) value), and destination related to service.

After receiving the sidelink UE information, the gNB constructs sidelink configuration at least including one or more resource pools for service and sidelink buffer status reporting (BSR) configuration. The gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a logical channel group (LCG), and a buffer size corresponding to the destination.

After receiving the sidelink BSR, the gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

For sidelink transmission, as mentioned above, when a UE meets a certain condition due to e.g., latency requirement with the configured sidelink grant (e.g., the configured sidelink grant cannot fulfil the latency requirement for sidelink transmission), the UE triggers TX carrier or resource reselection. Then, configured sidelink grant is cleared.

Currently, if TX carrier or resource reselection is triggered, the UE should clear all resources of the configured sidelink grant. However, a few of the resources from the configured grant can meet the certain condition for the configured sidelink grant. In this case, the corresponding resources from the configured grant which meets the certain condition may not need to be cleared.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
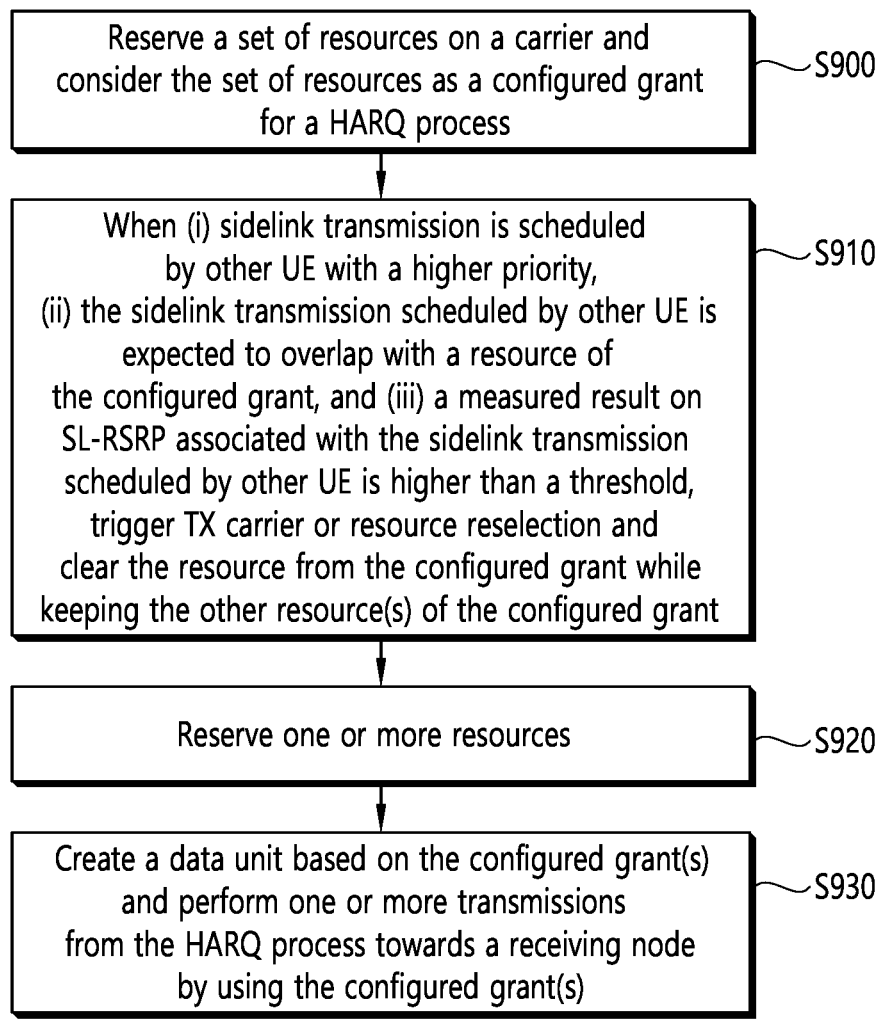
FIG. 9 shows an example of a method for performing data transmission by a UE to which the technical features of the present disclosure can be applied.

FIG. 9 shows an example of a method for performing data transmission by a UE to which the technical features of the present disclosure can be applied.

In step S900, the UE reserves a set of resources on a carrier and considers the set of resources as a configured grant for a HARQ process.

In some implementations, the set of resources may be reserved for transmissions of multiple MAC PDUs.

In some implementations, the set of resources may be a set of NR resources.

In some implementations, the resource may be either sidelink resource or uplink resource.

In some implementations, the configured grant may be one of a configured sidelink grant, a configured grant Type 1 and a configured grant Type 2.

In some implementations, the UE may clear the resource (i.e., only part) of the configured grant associated to the HARQ process (e.g., sidelink process) for a carrier, if available.

In step S910, when (i) sidelink transmission is scheduled by other UE with a higher priority, (ii) the sidelink transmission scheduled by the other UE is expected to overlap with a resource of the configured grant, and (iii) a measured result on sidelink reference signal received power (SL-RSRP) associated with the sidelink transmission scheduled by the other UE is higher than a threshold, the UE trigger TX carrier or resource reselection and clears the resource from the configured grant while keeping the other resource(s) of the configured grant.

More generally, upon detecting a condition for TX carrier or resource reselection being met for the resource of the configured grant, the UE may trigger TX carrier or resource reselection for transmission(s) of a single MAC PDU and clear the resource from the configured grant while keeping the other resource(s) of the configured grant. The conditions mentioned in step S910, i.e., (i) sidelink transmission is scheduled by other UE with a higher priority, (ii) the sidelink transmission scheduled by the other UE is expected to overlap with a resource of the configured grant, and (iii) a measured result on SL-RSRP associated with the sidelink transmission scheduled by the other UE is higher than a threshold, may be considered as one condition set for TX carrier or resource reselection.

In some implementations, even though not shown in FIG. 9, other conditions for TX carrier or resource reselection may include at least one of the followings.

if a resource of the configured grant cannot accommodate a RLC SDU by using the maximum allowed MCS configured by upper layers in maxMCS-PSSCH and the MAC entity selects not to segment the RLC SDU; or if transmission(s) with a resource of the configured grant cannot fulfil the latency requirement of the data in a logical channel according to the associated priority, and the MAC entity selects not to perform transmission(s) corresponding to a single MAC PDU; or if sidelink transmission (for either LTE V2X communication or NR communication) is scheduled by the other UE with a higher priority than the priority of the logical channel and expected to overlap with a resource of the configured grant, and the UE cannot simultaneously receive the sidelink transmission scheduled by the other UE and perform a transmission on the resource at the same time;

if LTE or NR uplink transmission is scheduled for a MAC PDU of the highest logical channel priority which has a higher priority than either a threshold or the priority of the logical channel and expected to overlap with a resource of the configured grant, and the UE cannot simultaneously perform the uplink transmission and a transmission on the resource at the same time; or if one or more retransmission resources of a configured grant on the carrier are still available for next retransmission(s) of the MAC PDU that was considered as successfully transmitted (e.g., due to reception of a positive acknowledgement to a transmission of a MAC PDU); or if sidelink transmission (for either LTE V2X communication or NR communication) is scheduled by the NG-RAN with a higher priority than the priority of the logical channel and expected to overlap with a resource of the configured grant, and the UE cannot simultaneously perform the sidelink transmission scheduled by the NG-RAN and perform a transmission on the resource at the same time;

In step S920, upon triggering the TX carrier or resource reselection for transmission(s), the UE reserves one or more resources for transmission(s).

In some implementations, the one or more resources for transmission(s) may be reserved for transmission(s) of a single MAC PDU.

In some implementations, the one of the resources may be used for new transmission of a single MAC PDU while the other resource(s) may be used for retransmission(s) of the MAC PDU.

In some implementations, the one of the resources used for new transmission may be added to the configured grant.

In step S930, the UE creates a data unit based on the configured grant(s) and performs one or more transmissions from a HARQ process towards a receiving node by using the configured grant(s).

In some implementations, the receiving node may be either another UE or a base station such as gNB or eNB. If the receiving node is another UE, the transmission may be performed in sidelink. If the receiving node is the base station, the transmission may be performed in uplink.

In some implementations, the data unit may be a MAC PDU.

Figure 10:
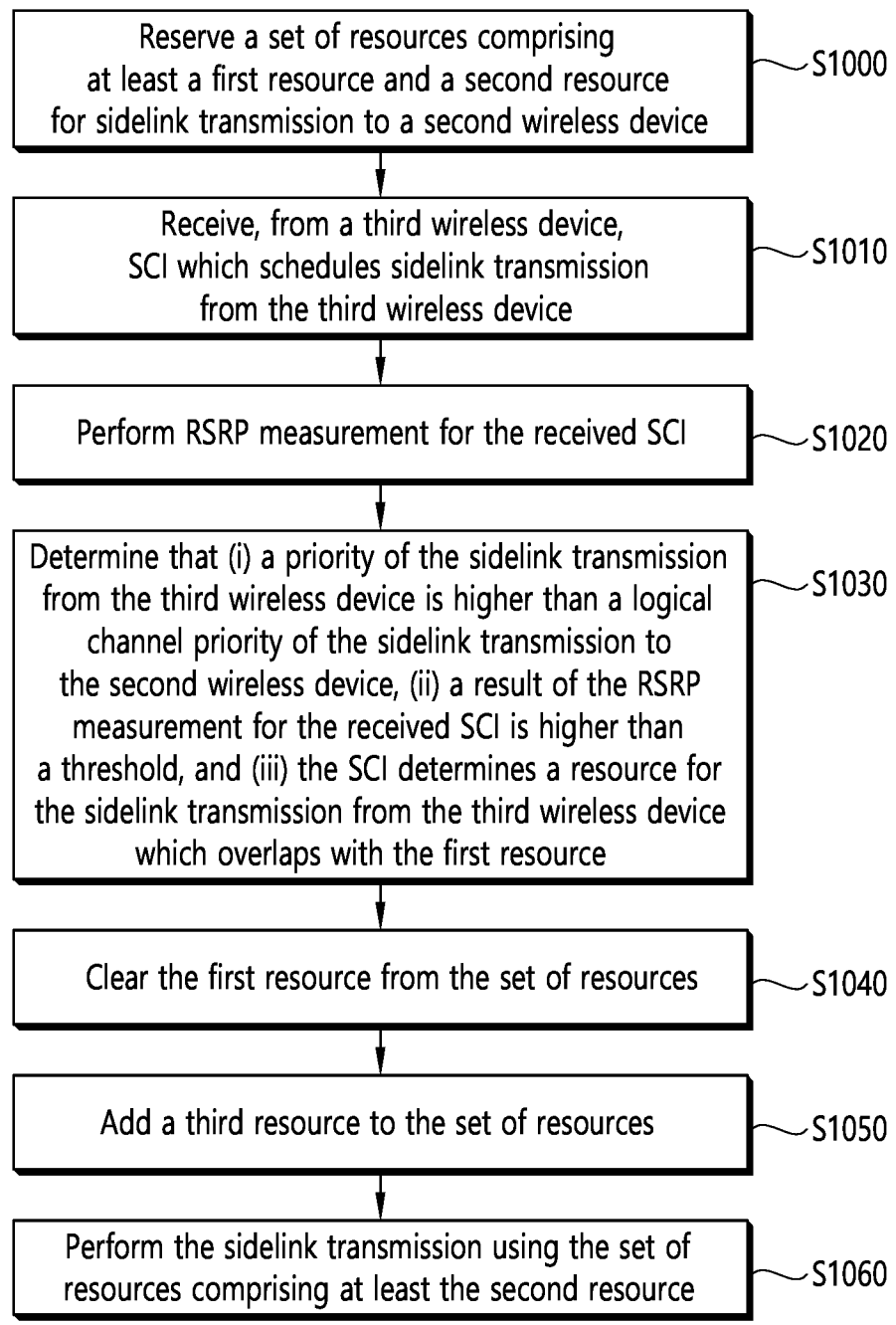
FIG. 10 shows an example of a method performed by a first wireless device (e.g., TX wireless device) to which the technical features of the present disclosure can be applied.

FIG. 10 shows an example of a method performed by a first wireless device (e.g., TX wireless device) to which the technical features of the present disclosure can be applied.

In step S1000, the first wireless device reserves a set of resources comprising at least a first resource and a second resource for sidelink transmission to a second wireless device.

In some implementations, the set of resources comprising at least the first resource and the second resource may be reserved for the sidelink transmission of multiple MAC PDUs.

In some implementations, the set of resources comprising at least the first resource and the second resource may be reserved on a carrier.

In some implementations, the set of resources comprising at least the first resource and the second resource may be considered as a sidelink grant for a HARQ process.

In step S1010, the first wireless device receives, from a third wireless device, SCI which schedules sidelink transmission from the third wireless device.

In step S1020, the first wireless device performs RSRP measurement for the received SCI.

In step S1030, the first wireless device determines that (i) a priority of the sidelink transmission from the third wireless device is higher than a logical channel priority of the sidelink transmission to the second wireless device, (ii) a result of the RSRP measurement for the received SCI is higher than a threshold, and (iii) the SCI determines a resource for the sidelink transmission from the third wireless device which overlaps with the first resource.

In step S1040, the first wireless device clears the first resource from the set of resources.

In step S1050, the first wireless device adds a third resource to the set of resources.

In other words, the three conditions mentioned above in step S1030 may be considered as conditions for transmission resource (re-)selection.

In some implementations, the second resource in the set of resources may be kept while the first resource is cleared from the set of resources.

In step S1060, the first wireless device performs the sidelink transmission to the second wireless device using the set of resources comprising at least the second resource and the third resource.

In some implementations, a MAC PDU for the sidelink transmission may be created based on the set of resources comprising at least the second resource and the third resource.

In some implementations, the first wireless device is in communication with at least one of a mobile device, a network, and/or autonomous vehicles other than the first wireless device.

Furthermore, the method in perspective of the first wireless device described above in FIG. 10 may be performed by first device 210 shown in FIG. 2, the first device 710 shown in FIG. 7 and/or the UE shown in FIG. 8.

More specifically, the first wireless device comprises at least one transceiver, at least processor, and at least one computer memory operably connectable to the at least one processor and storing instructions that, based on being executed by the at least one processor, perform operations below.

The operations comprise reserving a set of resources comprising at least a first resource and a second resource for sidelink transmission to a second wireless device.

In some implementations, the set of resources comprising at least the first resource and the second resource may be reserved for the sidelink transmission of multiple MAC PDUs.

In some implementations, the set of resources comprising at least the first resource and the second resource may be reserved on a carrier.

In some implementations, the set of resources comprising at least the first resource and the second resource may be considered as a sidelink grant for a HARQ process.

The operations comprise receiving, from a third wireless device, SCI which schedules sidelink transmission from the third wireless device.

The operations comprise performing RSRP measurement for the received SCI.

The operations comprise determining that (i) a priority of the sidelink transmission from the third wireless device is higher than a logical channel priority of the sidelink transmission to the second wireless device, (ii) a result of the RSRP measurement for the received SCI is higher than a threshold, and (iii) the SCI determines a resource for the sidelink transmission from the third wireless device which overlaps with the first resource.

The operations comprise clearing the first resource from the set of resources.

The operations comprise adding a third resource to the set of resources.

In other words, the three conditions mentioned above in step S1030 may be considered as conditions for transmission resource (re-)selection.

In some implementations, the second resource in the set of resources may be kept while the first resource is cleared from the set of resources.

The operations comprise performing the sidelink transmission to the second wireless device using the set of resources comprising at least the second resource and the third resource.

In some implementations, a MAC PDU for the sidelink transmission may be created based on the set of resources comprising at least the second resource and the third resource.

Furthermore, the method in perspective of the first wireless device described above in FIG. 10 may be performed by control of the processor 211 included in the first device 210 shown in FIG. 2, by control of the processor 713 included in the first device 710 shown in FIG. 7 and/or by control of the processor 810 included in the UE shown in FIG. 8.

More specifically, an apparatus for configured to operate in a wireless communication system (e.g., first wireless device) comprises at least processor, and at least one computer memory operably connectable to the at least one processor. The at least one processor is configured to perform operations comprising reserving a set of resources comprising at least a first resource and a second resource for sidelink transmission to a second wireless device, obtaining, from a third wireless device, SCI which schedules sidelink transmission from the third wireless device, performing RSRP measurement for the received SCI, determining that (i) a priority of the sidelink transmission from the third wireless device is higher than a logical channel priority of the sidelink transmission to the second wireless device, (ii) a result of the RSRP measurement for the received SCI is higher than a threshold, and (iii) the SCI determines a resource for the sidelink transmission from the third wireless device which overlaps with the first resource, clearing the first resource from the set of resources, adding a third resource to the set of resources, and controlling to perform the sidelink transmission to the second wireless device using the set of resources comprising at least the second resource and the third resource.

Furthermore, the method in perspective of the first wireless device described above in FIG. 10 may be performed by a software code 715 stored in the memory 714 included in the first device 710 shown in FIG. 7.

More specifically, at least one computer readable medium (CRM) stores instructions that, based on being executed by at least one processor, perform operations comprising reserving a set of resources comprising at least a first resource and a second resource for sidelink transmission to a second wireless device, obtaining, from a third wireless device, SCI which schedules sidelink transmission from the third wireless device, performing RSRP measurement for the received SCI, determining that (i) a priority of the sidelink transmission from the third wireless device is higher than a logical channel priority of the sidelink transmission to the second wireless device, (ii) a result of the RSRP measurement for the received SCI is higher than a threshold, and (iii) the SCI determines a resource for the sidelink transmission from the third wireless device which overlaps with the first resource, clearing the first resource from the set of resources, adding a third resource to the set of resources, and controlling to perform the sidelink transmission to the second wireless device using the set of resources comprising at least the second resource and the third resource.

According to implementations of the present disclosure shown in FIG. 10, an example of operations of the MAC entity may be as follows.

If a resource(s) of the selected sidelink grant is indicated for pre-emption by the physical layer due to (i) a priority of the sidelink transmission scheduled by SCI received from the other UE is higher than a logical channel priority of the sidelink transmission scheduled by its own SCI, (ii) the RSRP measurement performed for the received SCI is higher than a threshold, and (iii) the received SCI determines a resource for the sidelink transmission from the third wireless device which overlaps with a resource of the selected sidelink grant, the MAC entity removes the resource(s) (i.e., first resource mentioned above) from the selected sidelink grant associated to the sidelink process, randomly select the time and frequency resource (i.e., third resource mentioned above) from the resources indicated by the physical layer for the removed resource, and replace the removed resource(s) by the selected resource(s) for the selected sidelink grant.

Figure 11:
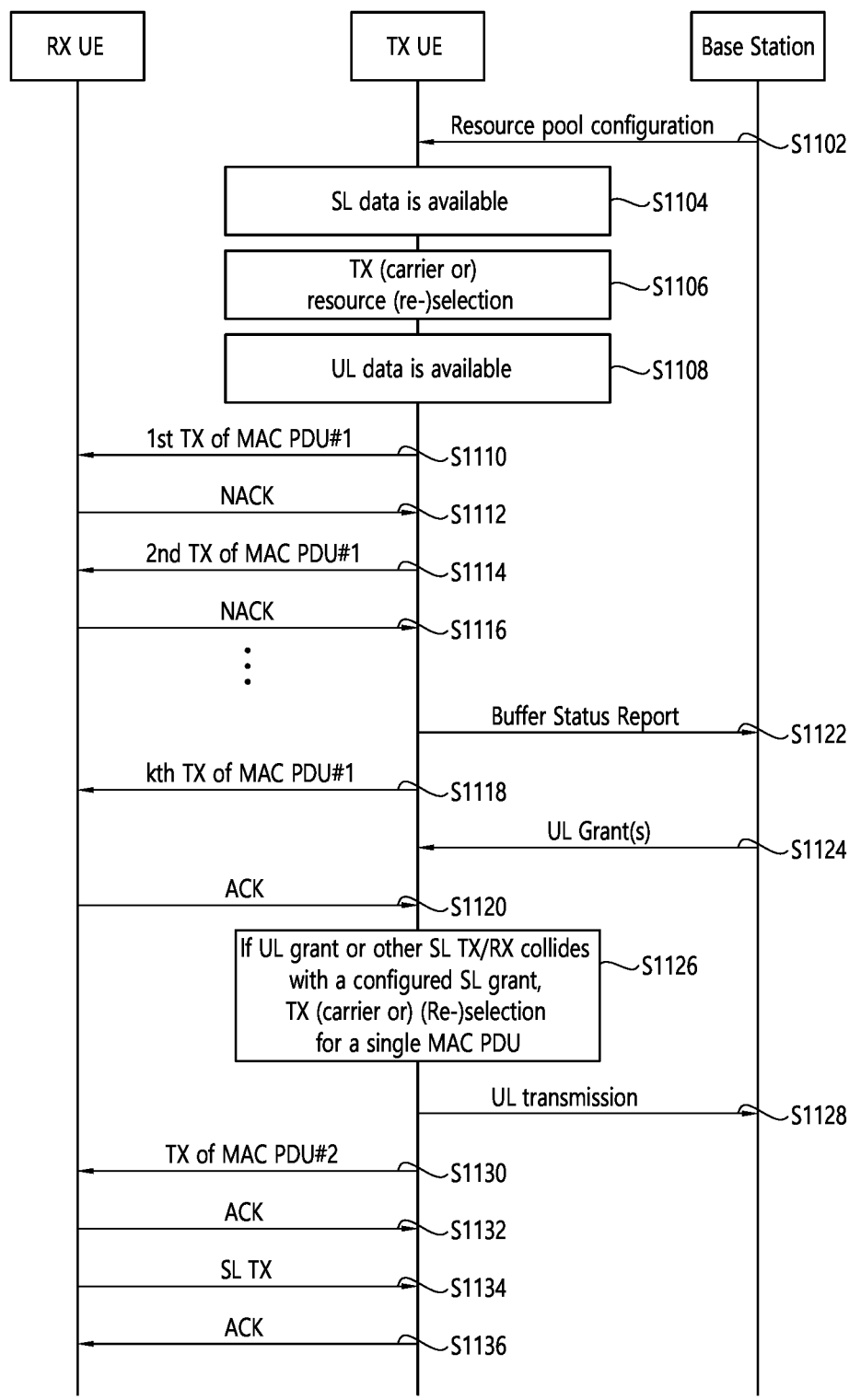
FIG. 11 shows an example of TX carrier or resource reselection for sidelink data transmission from a UE to which the technical features of the present disclosure can be applied.

FIG. 11 shows an example of TX carrier or resource reselection for sidelink data transmission from a UE to which the technical features of the present disclosure can be applied.

In step S1102, the TX UE may receive a resource pool configuration from a base station.

In step S1104, SL data may be available.

In step S1106, the TX UE performs TX carrier or resource (re)-selection. In other words, the TX UE may reserve a set of resources on a carrier and considers the set of resources as a configured grant for a HARQ process.

The set of resources may be reserved for transmissions of multiple MAC PDUs.

The set of resources may be a set of NR resources.

The set of resources may be either sidelink resource or uplink resource.

The configured grant may be one of a configured sidelink grant, a configured grant Type 1 and a configured grant Type 2.

The TX UE may clear the resource (i.e., only part) of the configured sidelink grant associated to the HARQ process (e.g., sidelink process) for a carrier, if available.

In step S1108, UL data may be available.

In step S1110, the TX UE performs a first transmission of MAC PDU #1 to the RX UE. In step S1112, the RX UE transmits non-acknowledgement (NACK) for the first transmission of MAC PDU #1 to the TX UE.

In step S1114, the TX UE performs a second transmission of MAC PDU #1 to the RX UE. In step S1116, the RX UE transmits NACK for the second transmission of MAC PDU #1 to the TX UE.

In step S1118, the TX UE performs a k-th transmission of MAC PDU #1 to the RX UE. In step S1120, the RX UE transmits (positive) ACK for the k-th transmission of MAC PDU #1 to the TX UE.

Meanwhile, in step S1122, the TX UE transmits a buffer status report (BSR) for the UL data to the base station. In step S1124, the TX UE receives UL grant(s) for transmission of the UL data from the base station.

In step S1126, when the TX UE detects that one of the following conditions is met for a resource of the configured sidelink grant, the TX UE triggers TX carrier or resource reselection for transmission(s) of a single MAC PDU and clears the resource from the configured sidelink grant while keeping the other resource(s) of the configured sidelink grant:

- if a resource of the configured sidelink grant cannot accommodate a RLC SDU by using the maximum allowed MCS configured by upper layers in maxMCS-PSSCH and the MAC entity selects not to segment the RLC SDU (NOTE: If the configured sidelink grant cannot accommodate the RLC SDU, it is left for UE implementation whether to perform segmentation or sidelink resource reselection); or
- if transmission(s) with a resource of the configured sidelink grant cannot fulfil the latency requirement of the SL data in a logical channel according to the associated priority, and the MAC entity selects not to perform transmission(s) corresponding to a single MAC PDU (NOTE: If the latency requirement is not met, it is left for UE implementation whether to perform transmission(s) corresponding to single MAC PDU or sidelink resource reselection); or
- if sidelink transmission (for either LTE V2X communication or NR communication) is scheduled by the other UE with a higher priority than the priority of the logical channel and expected to overlap with a resource of the configured sidelink grant, and a measured result on SL-RSRP associated with the sidelink transmission is higher than threshold; or
- if sidelink transmission (for either LTE V2X communication or NR communication) is scheduled by the other UE with a higher priority than the priority of the logical channel and expected to overlap with a resource of the configured sidelink grant, and the UE cannot simultaneously receive the sidelink transmission scheduled by the other UE and perform a sidelink transmission on the resource of the configured sidelink grant; or
- if LTE or NR uplink transmission is scheduled for a MAC PDU of the highest logical channel priority which has a higher priority than either a threshold or the priority of the logical channel and expected to overlap with a SL resource of the configured sidelink grant, and the UE cannot simultaneously perform the uplink transmission and a sidelink transmission on the resource of the configured sidelink grant at the same time; or if one or more retransmission resources of the configured sidelink grant on the carrier are still available for next retransmission(s) of the MAC PDU that was considered as successfully transmitted (e.g. due to reception of a positive acknowledgement to a transmission of a MAC PDU); or if sidelink transmission (for either LTE V2X communication or NR communication) is scheduled by the NG-RAN with a higher priority than the priority of the logical channel and expected to overlap with a SL resource of the configured sidelink grant, and the UE cannot simultaneously perform the sidelink transmission scheduled by the NG-RAN and perform a sidelink transmission on the resource of the configured sidelink grant at the same time;

Upon triggering TX carrier or resource reselection for transmission(s) of a single MAC PDU in step S1126, the TX UE may reserve one or more resources for transmission(s) of a single MAC PDU.

The one of the resources may be used for new transmission of a single MAC PDU while the other resource(s) may be used for retransmission(s) of the MAC PDU.

The one of the resources used for new transmission may be added to the configured sidelink grant.

The TX UE may create a data unit based on the grant(s) and performs one or more transmissions from a HARQ process towards a receiving node by using the grant(s).

The receiving node may be either another UE or a base station such as gNB or eNB.

If the receiving node is another UE, the transmission may be performed in sidelink. If the receiving node is the base station, the transmission may be performed in uplink.

The data unit may be a MAC PDU.

For example, in step S1128, the TX UE performs UL transmission to the base station by using the UL grant(s) received in step S1124.

For example, in step S1130, the TX UE performs a transmission of MAC PDU #2 to the RX UE. In step S1132, the RX UE transmits (positive) ACK for the transmission of MAC PDU #2 to the TX UE.

For example, in step S1134, the TX UE receives sidelink transmission from the RX UE. In step S1136, the TX UE transmits (positive) ACK for the sidelink transmission to the RX UE.

Furthermore, when the UE detects that one of the following conditions is met for a resource of the configured grant, the UE may trigger TX carrier or resource reselection for transmissions of multiple MAC PDUs and clears the configured grant (i.e., all resources of the configured grant):

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during a time interval; or if sl-ReselectAfter is configured and the number of consecutive unused transmission opportunities on resources indicated in the configured sidelink grant is equal to sl-ReselectAfter; or if there is no configured sidelink grant on the carrier which is mapped to the logical channel, QoS requirement of the logical channel, the destination of the logical channel, or the cast type of the logical channel; or if there is no configured sidelink grant on the carrier for which HARQ feedback is enabled, in case that HARQ feedback is enabled for the logical channel; or if there is no configured sidelink grant on the carrier for which HARQ feedback is disabled, in case that HARQ feedback is disabled for the logical channel; or if there is no configured sidelink grant on the carrier for which the MCS level is supported, in case that the MCS level is configured for the logical channel; or if there is no configured sidelink grant on the carrier for which the cast type is supported, in case that the cast type (i.e., one or more of unicast, groupcast and broadcast) is configured for the logical channel; or if a pool of resources is configured or reconfigured by upper layers For the sake of convenience, FIG. 11 shows sidelink data transmission, but this is only exemplary. Implementations of the present disclosure shown in FIG. 11 is not limited to the sidelink data transmission, but can also be applied to TX carrier or resource reselection for the uplink data transmission as well. That is, the present disclosure can also be applied to HARQ transmission and/or retransmissions of a MAC PDU in uplink. In this case, the RX UE in FIG. 11 can be replaced by the same or a different base station.

Furthermore, according to implementations of the present disclosure shown in FIG. 11, an example of a method performed by a RX UE (e.g., second wireless device) may be as follows.

The second wireless device performs a sidelink transmission with a first wireless device using a set of resources comprising at least a first resource and a second resource. It is determined by the first wireless device that (i) a priority of a sidelink transmission from a third wireless device is higher than a logical channel priority of the sidelink transmission with the first wireless device, (ii) a result of RSRP measurement for SCI, transmitted from the third wireless device to the first wireless device, is higher than a threshold, and (iii) the SCI determines a resource for the sidelink transmission from the third wireless device which overlaps with the first resource.

The second wireless device performs the sidelink transmission with the first wireless device using the set of resources comprising at least the second resource and a third resource. The first resource is cleared from the set of resources, and the third resource is added to the set of resources.

Furthermore, the method in perspective of the second wireless device described above may be performed by second device 220 shown in FIG. 2, the second device 720 shown in FIG. 7 and/or the UE shown in FIG. 8.

More specifically, the second wireless device comprises at least one transceiver, at least processor, and at least one computer memory operably connectable to the at least one processor and storing instructions that, based on being executed by the at least one processor, perform operations comprising performing a sidelink transmission with a first wireless device using a set of resources comprising at least a first resource and a second resource, wherein it is determined by the first wireless device that (i) a priority of a sidelink transmission from a third wireless device is higher than a logical channel priority of the sidelink transmission with the first wireless device, (ii) a result of RSRP measurement for SCI, transmitted from the third wireless device to the first wireless device, is higher than a threshold, and (iii) the SCI determines a resource for the sidelink transmission from the third wireless device which overlaps with the first resource, and performing the sidelink transmission with the first wireless device using the set of resources comprising at least the second resource and a third resource, wherein the first resource is cleared from the set of resources, and the third resource is added to the set of resources.

The present disclosure may be applied to various future technologies, such as AI.

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 12:
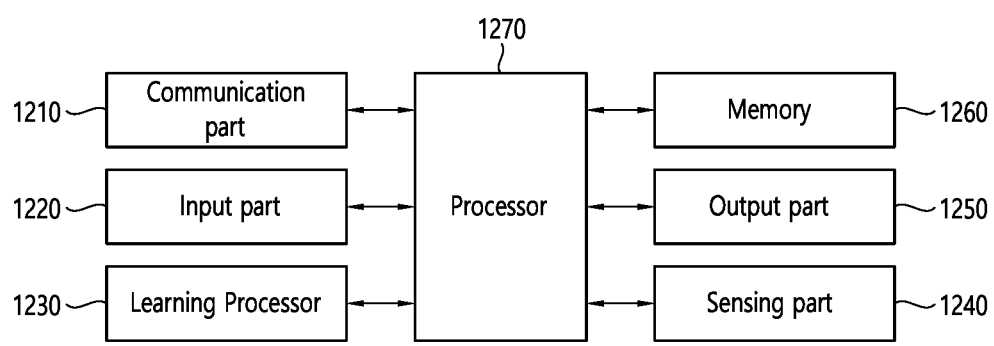
FIG. 12 shows an example of an AI device to which the technical features of the present disclosure can be applied.

FIG. 12 shows an example of an AI device to which the technical features of the present disclosure can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc.

The output part 1250 may include a display unit for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
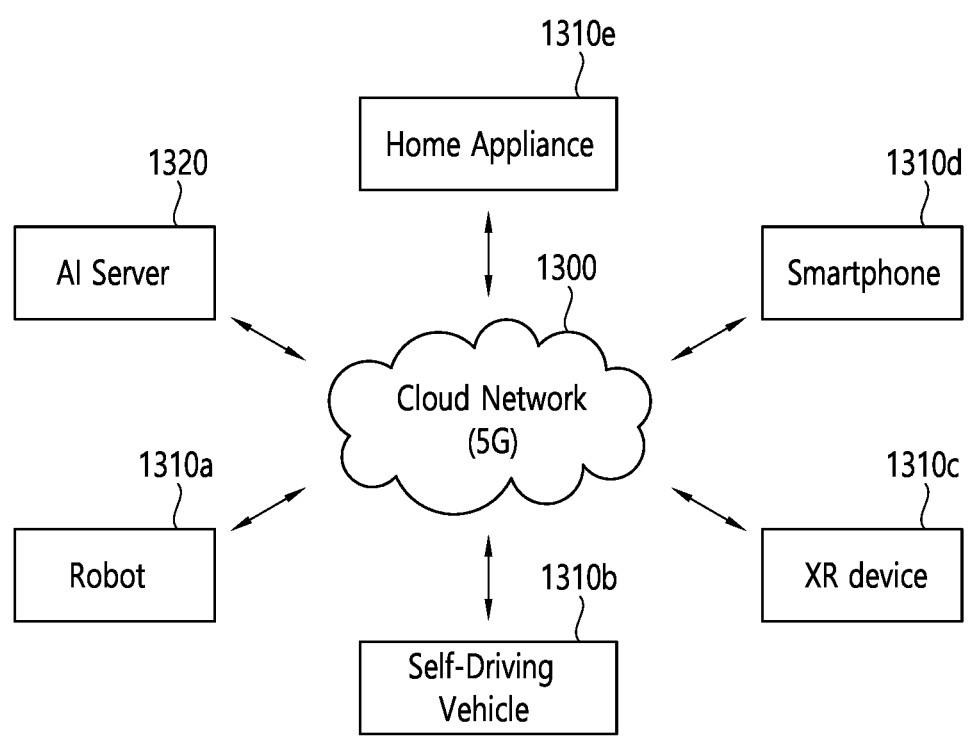
FIG. 13 shows an example of an AI system to which the technical features of the present disclosure can be applied.

FIG. 13 shows an example of an AI system to which the technical features of the present disclosure can be applied.

Referring to FIG. 13, in the AI system, at least one of an AI server 1320, a robot 1310*a*, an autonomous vehicle 1310*b*, an XR device 1310*c*, a smartphone 1310*d* and/or a home appliance 1310*e* is connected to a cloud network 1300. The robot 1310*a*, the autonomous vehicle 1310*b*, the XR device 1310*c*, the smartphone 1310*d*, and/or the home appliance 1310*e* to which the AI technology is applied may be referred to as AI devices 1310*a* to 1310*e*.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310*a* to 1310*e* and 1320 consisting the AI system may be connected to each other through the cloud network 1300. In particular, each of the devices 1310*a* to 1310*e* and 1320 may communicate with each other through a base station, but may directly communicate with each other without using a base station.

The AI server 1320 may include a server for performing AI processing and a server for performing operations on big data. The AI server 1320 is connected to at least one or more of AI devices constituting the AI system, i.e., the robot 1310*a*, the autonomous vehicle 1310*b*, the XR device 1310*c*, the smartphone 1310*d* and/or the home appliance 1310*e* through the cloud network 1300, and may assist at least some AI processing of the connected AI devices 1310*a* to 1310*e*. The AI server 1320 can learn the ANN according to the machine learning algorithm on behalf of the AI devices 1310*a* to 1310*e*, and can directly store the learning models and/or transmit them to the AI devices 1310*a* to 1310*e*. The AI server 1320 may receive the input data from the AI devices 1310*a* to 1310*e*, infer the result value with respect to the received input data using the learning model, generate a response and/or a control command based on the inferred result value, and transmit the generated data to the AI devices 1310*a* to 1310*e*. Alternatively, the AI devices 1310*a* to 1310*e* may directly infer a result value for the input data using a learning model, and generate a response and/or a control command based on the inferred result value.

Various embodiments of the AI devices 1310*a* to 1310*e* to which the technical features of the present disclosure can be applied will be described. The AI devices 1310*a* to 1310*e* shown in FIG. 13 can be seen as specific embodiments of the AI device 1200 shown in FIG. 12.

The present disclosure can have various advantageous effects.

For example, data loss which can be caused by collision of multiple SL transmissions by different UEs can be avoided.

For example, a UE performing HARQ transmission of a packet by using radio resources can dynamically and efficiently allocate resources for retransmissions of the packet.

For example, a UE can dynamically and efficiently allocate resources for retransmissions of the packet by considering service characteristics and/or requirements.

For example, a UE can dynamically and efficiently allocate resources for retransmissions of the packet in particular when packets from various services are multiplexed into a single data unit.

For example, the system can provide dynamic and efficient allocation of resources for data retransmissions for a UE performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device configured to operate in a wireless communication system, the method comprising:

reserving a set of resources comprising at least a first resource and a second resource for a sidelink transmission to a second wireless device, wherein the set of resources is considered as a sidelink grant;

receiving, from a third wireless device, sidelink control information (SCI) related to a sidelink reception from the third wireless device;

performing a reference signal received power (RSRP) measurement for the SCI;

determining that (i) a result of the RSRP measurement for the SCI is higher than a threshold, (ii) the SCI determines a resource for the sidelink reception which overlaps with the first resource, and (iii) a priority related to the sidelink reception is higher than a priority related to the sidelink transmission;

based on the determination, (i) clearing the first resource from the sidelink grant, and (ii) adding a third resource to the sidelink grant; and performing the sidelink transmission to the second wireless device based on the sidelink grant comprising at least the second resource and the third resource.

2. The method of claim 1, wherein the set of resources comprising at least the first resource and the second resource is reserved for the sidelink transmission of multiple media access control (MAC) protocol data units (PDUs).

3. The method of claim 1, wherein the set of resources comprising at least the first resource and the second resource is reserved on a carrier.

4. The method of claim 1, wherein the second resource is kept in the sidelink grant while the first resource is cleared from the sidelink grant.

5. The method of claim 1, wherein a MAC PDU for the sidelink transmission is created based on the sidelink grant.

6. The method of claim 1, wherein the first wireless device is in communication with at least one of a mobile device, a network, and/or autonomous vehicles other than the first wireless device.

7. A first wireless device configured to operate in a wireless communication system, the wireless device comprising:

at least one transceiver;

at least one processor; and at least one computer memory operably connectable to the at least one processor and storing instructions that, based on being executed by the at least one processor, perform operations comprising:

reserving a set of resources comprising at least a first resource and a second resource for a sidelink transmission to a second wireless device, wherein the set of resources is considered as a sidelink grant;

receiving, from a third wireless device, via the at least one transceiver, sidelink control information (SCI) related to a sidelink reception from the third wireless device;

performing a reference signal received power (RSRP) measurement for the received SCI;

determining that (i) a result of the RSRP measurement for the SCI is higher than a threshold, (ii) the SCI determines a resource for the sidelink reception which overlaps with the first resource, and (iii) a priority related to the sidelink reception is higher than a priority related to the sidelink transmission;

based on the determination, (i) clearing the first resource from the sidelink grant, and (ii) adding a third resource to the sidelink grant; and performing the sidelink transmission to the second wireless device via the at least one transceiver based on the sidelink grant comprising at least the second resource and the third resource.

8. The first wireless device of claim 7, wherein the set of resources comprising at least the first resource and the second resource is reserved for the sidelink transmission of multiple media access control (MAC) protocol data units (PDUs).

9. The first wireless device of claim 7, wherein the set of resources comprising at least the first resource and the second resource is reserved on a carrier.

10. The first wireless device of claim 7, wherein the second resource is kept in the sidelink grant while the first resource is cleared from the sidelink grant.

11. The first wireless device of claim 7, wherein a MAC PDU for the sidelink transmission is created based on the sidelink grant.

12. A first wireless device configured to operate in a wireless communication system, the wireless device comprising:

at least one processor; and at least one computer memory operably connectable to the at least one processor, wherein the at least one processor is configured to perform operations comprising:

reserving a set of resources comprising at least a first resource and a second resource for a sidelink transmission to a second wireless device, wherein the set of resources is considered as a sidelink grant;

obtaining, from a third wireless device, sidelink control information (SCI) related to a sidelink reception from the third wireless device;

performing a reference signal received power (RSRP) measurement for the SCI;

determining that (i) a result of the RSRP measurement for the SCI is higher than a threshold, (ii) the SCI determines a resource for the sidelink reception which overlaps with the first resource, and (iii) a priority related to the sidelink transmission is higher than a priority related to the sidelink transmission;

based on the determination, (i) clearing the first resource from the sidelink grant, and (ii) adding a third resource to the sidelink grant; and controlling to perform the sidelink transmission to the second wireless device based on the sidelink grant comprising at least the second resource and the third resource.

* * * * *